(12) United States Patent
Toya

(10) Patent No.: US 6,304,061 B1
(45) Date of Patent: Oct. 16, 2001

(54) METHOD OF CONTROLLING CHARGING AND DISCHARGING

(75) Inventor: Shoichi Toya, Mihara-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/447,960

(22) Filed: Nov. 29, 1999

(30) Foreign Application Priority Data

Nov. 30, 1998 (JP) .................................................. 10-340494
Aug. 19, 1999 (JP) .................................................. 11-232907

(51) Int. Cl.$^7$ ........................................................ H02J 7/00
(52) U.S. Cl. ............................................. 320/134; 320/128
(58) Field of Search ..................................... 320/134, 128, 320/137, 149, 116, 118

(56) References Cited

U.S. PATENT DOCUMENTS

| | | | |
|---|---|---|---|
| 5,545,969 | * | 8/1996 | Hasegawa .............................. 320/134 |
| 5,701,068 | * | 12/1997 | Baer et al. ............................ 320/119 |
| 5,880,575 | | 3/1999 | Itou et al. ............................. 320/122 |
| 6,054,840 | * | 4/2000 | Nakanishi et al. .................... 320/118 |

FOREIGN PATENT DOCUMENTS 19704310  8/1997 (DE) .
7-335266  12/1995 (JP) .

* cited by examiner

*Primary Examiner*—Peter S. Wong
*Assistant Examiner*—Lawrence Luk
(74) *Attorney, Agent, or Firm*—Wenderoth, Lind & Ponack, L.L.P.

(57) ABSTRACT

The method computes a capacity of a battery array formed from a plurality of rechargeable batteries connected in series while controlling battery array charging and discharging. An upper capacity limit lower than a battery array full charge capacity, a lower capacity limit greater than a complete discharge capacity, and a specified capacity within a range between the upper and lower capacity limits are established. Battery array charging and discharging is permitted when computed capacity is within the range between upper and lower capacity limits. When computed capacity reaches the upper capacity limit, charging is prohibited until battery array capacity drops to the specified capacity, and when computed capacity reaches the lower capacity limit, discharging is prohibited until battery array capacity rises to the specified capacity.

32 Claims, 7 Drawing Sheets

METHOD OF CONTROLLING CHARGING AND DISCHARGING

This application is based on applications No. 10-340494 filed in Japan on Nov. 30, 1998 and No.11-232907 filed in Japan on Aug. 19, 1999, the contents of which are incorporated hereto by reference.

BACKGROUND OF THE INVENTION

This invention relates to a method of computing the capacity of a battery array made up of a plurality of rechargeable batteries connected in series, and controlling charging and discharging of the battery array.

A rechargeable battery capable of repeated charging and discharging is provided with a full charge detection circuit and an over-discharge protection circuit to prevent overcharging and over-discharging. As means of detecting whether a battery is fully charged, the voltage detection method which detects a rechargeable battery's voltage, the −DV method which detects a specified voltage drop from a peak rechargeable battery voltage, the temperature detection method which detects a rechargeable battery's temperature, and other methods are known. In addition, methods such as rechargeable battery voltage detection are widely known for incorporation into an over-discharge protection circuit.

Incidentally, in the use of rechargeable batteries as power sources, a plurality of rechargeable batteries are often electrically connected together in both series and parallel combinations for use as a battery array. In the case of a battery array, the capacity of each individual rechargeable battery and the performance of each rechargeable battery with charging and discharging shows some variation, and all rechargeable batteries do not react in exactly the same way. Consequently, even though observation of the over-all battery array shows no indication of a problem, it is possible that one part of the rechargeable battery array has overcharged or over-discharged and the battery array as a whole has been degraded.

To solve this problem, Japanese Patent Application HEI 7-335266 (1995) discloses a provision for bypass circuitry for each of a plurality of rechargeable batteries connected in series. However, for the case of a battery array used as a power source for an electric automobile, the number of rechargeable batteries connected in series is around two hundred, and circuit complexity becomes extreme.

Thus, it is an object of the present invention to provide a method of controlling charging and discharging of a battery array via a simple configuration that prevents over-charging and over-discharge of each component rechargeable battery of the battery array.

The above and further objects and features of the invention will more fully be apparent from the following detailed description with a accompanying drawings.

SUMMARY OF THE INVENTION

The first embodiment of the present invention is a method of controlling the charging and discharging of a battery array while computing the capacity of the battery array which is made up of a plurality of rechargeable batteries connected in series. An upper capacity limit lower than the full charge capacity of the battery array, a lower capacity limit greater than the capacity at complete discharge, and a specified capacity in the range between the upper capacity limit and the lower capacity limit are established. When the computed capacity is within the range between the upper capacity limit and the lower capacity limit, battery array charging and discharging are allowed. When the computed capacity of the battery array reaches the upper capacity limit, only battery array discharging is permitted until the computed capacity becomes equal to the specified capacity. When the computed capacity of the battery array reaches the lower capacity limit, only battery array charging is permitted until the computed capacity becomes equal to the specified capacity.

In addition, the invention is characterized by revising battery array computed capacity when the computed capacity reaches the upper capacity limit or the lower capacity limit more than a specified number of times, or each time a specified time period has elapsed.

Revision of the computed capacity of the battery array is characterized by charging the battery array to a capacity tolerance limit lower than the full charge capacity, greater than the upper capacity limit, and reached when a battery temperature or a derivative of a temperature rise of at least one rechargeable battery of the battery array becomes equal to or greater than a specified value, or battery voltage becomes equal to or greater than a specified voltage. At that point, the capacity tolerance limit is written into the battery array computed capacity and subsequently, charging is prohibited until battery array computed capacity reaches the specified capacity.

The second embodiment of the present invention is a method of controlling the charging and discharging of a battery array while computing the capacity of the battery array which is made up of a plurality of rechargeable batteries connected in series. An upper capacity limit lower than the full charge capacity of the battery array, a lower capacity limit greater than the capacity at complete discharge, an a specified capacity in the range between the upper capacity limit and the lower capacity limit are established. When the computed capacity is within the range between the upper capacity limit and the lower capacity limit, battery array charging and discharging are allowed. When the computed capacity of the battery array reaches the upper capacity limit, only battery array discharge is permitted until the computed capacity becomes equal to the specified capacity. When the computed capacity of the battery array reaches the lower capacity limit, only battery array charging is permitted until the computed capacity becomes equal to the specified capacity, and battery array capacity computation is performed such that it is less than the computed battery array capacity. When a battery temperature or a derivative of a temperature rise of at least one rechargeable battery of the battery array becomes equal to or greater than a specified value during battery array charging, charging is suspended and a capacity tolerance limit lower than the full charge capacity and greater than the upper capacity limit is written into the computed battery array capacity.

After writing the capacity tolerance limit into the battery array capacity, battery array charging and discharging are allowed while the computed capacity is within range between the upper capacity limit and the lower capacity limit until the computed capacity of the battery array reaches the specified capacity. When the computed capacity of the battery array reaches the upper capacity limit, only battery array discharge is permitted until the computed capacity becomes equal to the specified capacity. When the computed capacity of the battery array reaches the lower capacity limit, only battery array charging is permitted until the computed capacity becomes equal to the specified capacity, and battery array computed capacity computation is performed such that it is greater than actual battery array capacity.

The third embodiment of the present invention is a method of controlling the charging and discharging of a battery array while computing the capacity of the battery array which is made up of a plurality of rechargeable batteries connected in series. An upper capacity limit lower than the full charge capacity of the battery array, a restricted charging capacity limit lower than the upper capacity limit for restricted charging, a lower capacity limit greater than the capacity at complete discharge, a restricted discharging capacity limit greater than the lower capacity limit for restricted discharging, and a specified capacity in the range between the restricted charging capacity limit for restricted charging and the restricted discharging capacity limit for restricted discharging are established. When the computed capacity is within the unrestricted region, battery array charging and discharging are allowed. When the computed capacity of the battery array is within the restricted charging region between the upper capacity limit and the restricted charging capacity limit for restricted charging, or when the computed capacity of the battery array is within the restricted discharge region between the lower capacity limit and the restricted discharging capacity limit for restricted discharging, battery array charging and discharging is allowed with a restricted charging or discharging current. When the computed capacity of the battery array reaches the upper capacity limit, only battery array discharging is permitted until the computed capacity becomes equal to the specified capacity. When the computed capacity of the battery array reaches the lower capacity limit, only battery array charging is permitted until the computed capacity becomes equal to the specified capacity.

In the charging and discharging of the battery array made up of the plurality of rechargeable batteries connected in series, the present invention enables charging and discharging of the battery array while reliably preventing over-charging and over-discharging of all component rechargeable batteries regardless of the capacity and the performance variations of each component rechargeable battery.

DETAILED DESCRIPTION OF THE INVENTION

Figure 1:
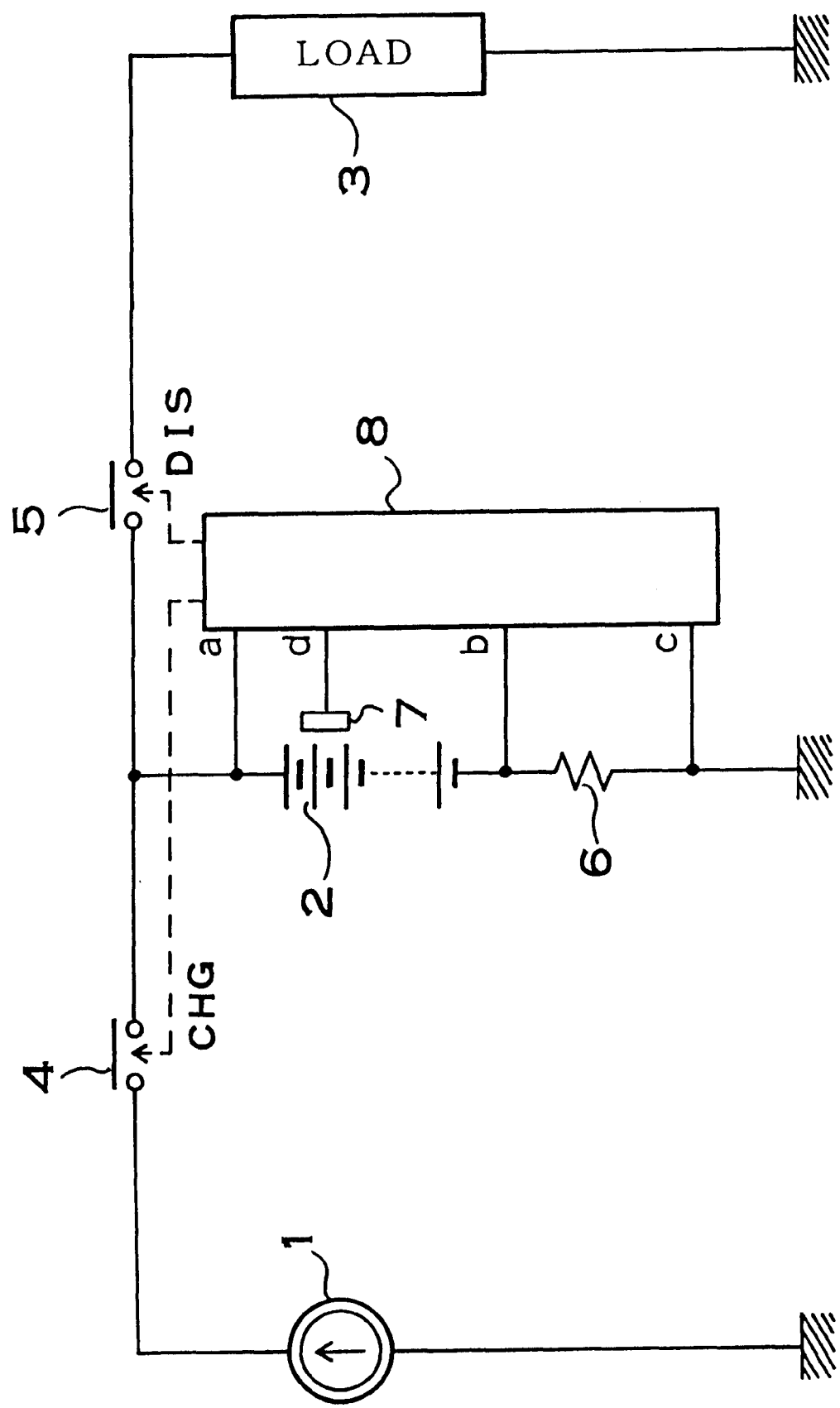
FIG. 1 is a block circuit diagram showing an embodiment of the present invention.

FIG. 1 shows an embodiment of the present invention. In FIG. 1, 1 is a battery charger, 2 is a battery array made up of a plurality of rechargeable batteries (for example 200 nickel hydrogen batteries) electrically connected in series, 3 is a load driven by the rechargeable battery array 2, 4 is a charging switch between the charger 1 and the battery array 2, 5 is a discharging switch between the battery array 2 and the load 3, 6 is a battery array 2 charging current and discharge current resistor connected in series with the battery array 2, 7 is a temperature sensing element for detecting temperature of the battery array 2, and 8 is a control circuit for controlling whether the charging switch 4 and the discharging switch 5 are on or off based on a battery array 2 capacity, battery voltage, and temperature, etc.

Battery temperature detection can be a detection of the temperature of all the rechargeable batteries or the temperature of designated blocks of the battery array.

Figure 2:
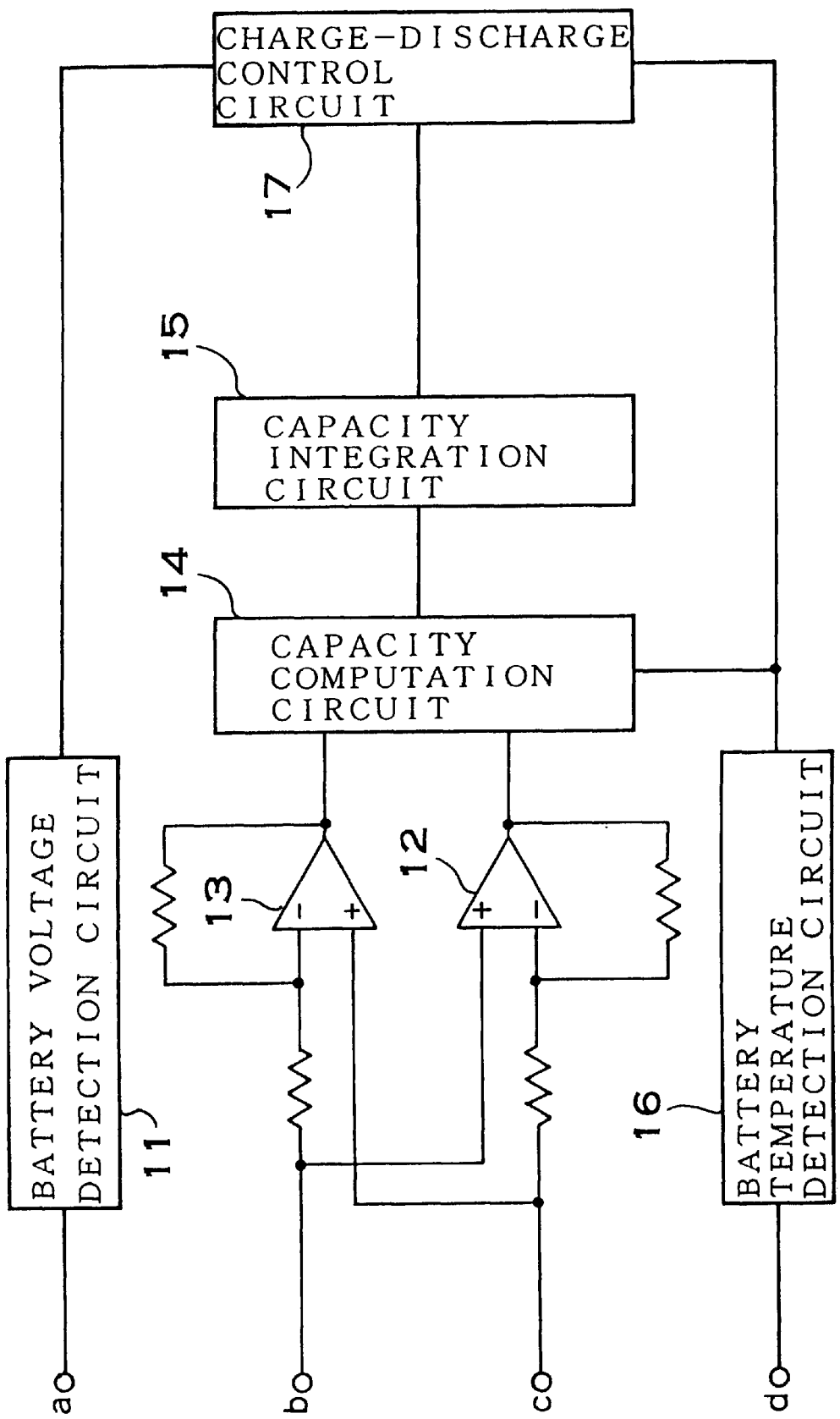
FIG. 2 is a block circuit diagram showing details of important parts of an embodiment of the present invention.

FIG. 2 shows the details of the control circuit 8. In FIG. 2, 11 is a battery voltage detection circuit for measuring the voltage of the battery array 2, and 12 and 13 are first and second amplifiers for amplifying a voltage developed across two terminals of the current detection resistor 6. When a charging current flows through the battery array 2, a voltage proportional to the voltage across current detection resistor 6 is outputted by the first amplifier 12. On the contrary, when a discharging current flows through the battery array 2, a voltage proportional to the voltage across the current detection resistor 6 is outputted by the second amplifier 13.

In FIG. 2, 14 is a capacity computation circuit which multiplies the charging current and the discharging current, namely the output signal from the first amplifier 12 and the second amplifier 13, by a specified time to compute the charging capacity and the discharging capacity of the battery array 2. Further, 15 is a capacity integration circuit which integrates the battery array 2 capacity based on the computed results from the capacity computation circuit 14. The capacity integration circuit 15 successively adds to the computed battery array 2 capacity during charging, and subtracts from the computed battery array 2 capacity during discharging. Integration results from the capacity integration circuit 15 become the computed capacity of the battery array 2.

In FIG. 2, 16 is a battery temperature detection circuit which determines battery array 2 temperature via a signal from the temperature sensing element 7. Finally, 17 is a charge-discharge control circuit which controls whether the charging switch 4 and the discharging switch 5 are on or off based on results from the capacity integration circuit 15, the battery voltage detection circuit 11, and the battery temperature detection circuit 16.

In the control circuit 8, it is preferable to implement the capacity computation circuit 14, the capacity integration circuit 15, and the charge-discharge control circuit 17 system as a microcomputer.

Figure 3:
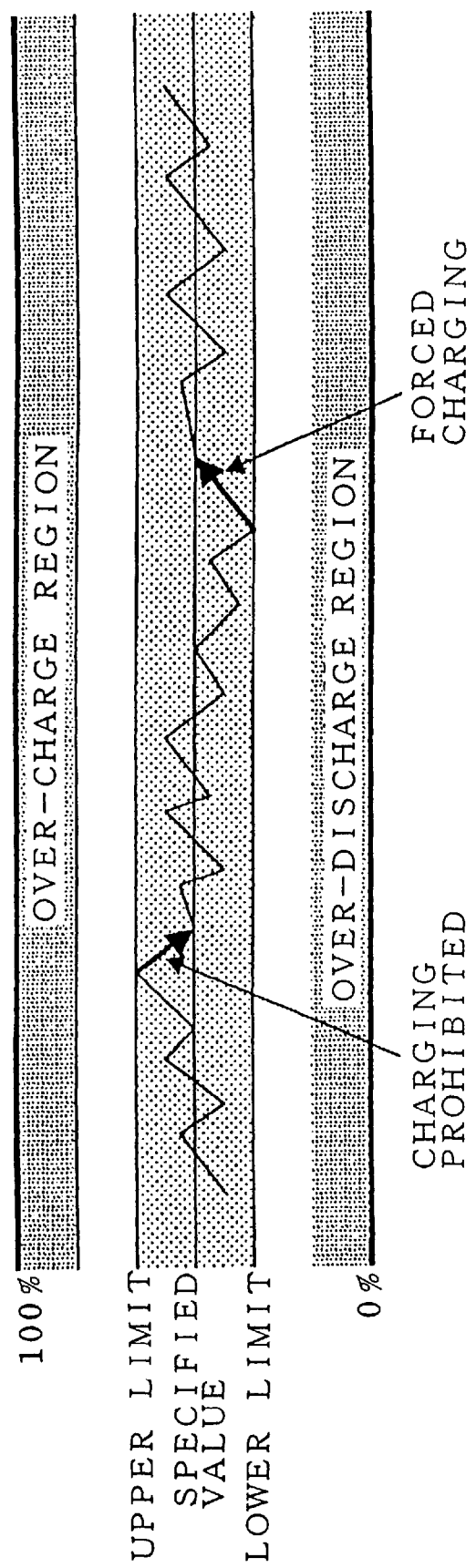
FIG. 3 is a battery capacity graph showing operation of a first embodiment.

The following describes the first embodiment. As shown in FIG. 3, within the full charge capacity (100%) of the battery array 2, charging and discharging fundamentally take place within a specified range defined by a lower capacity limit (for example, 45% of full charge capacity) and an upper capacity limit (for example, 55% of full charge capacity).

Figure 4:
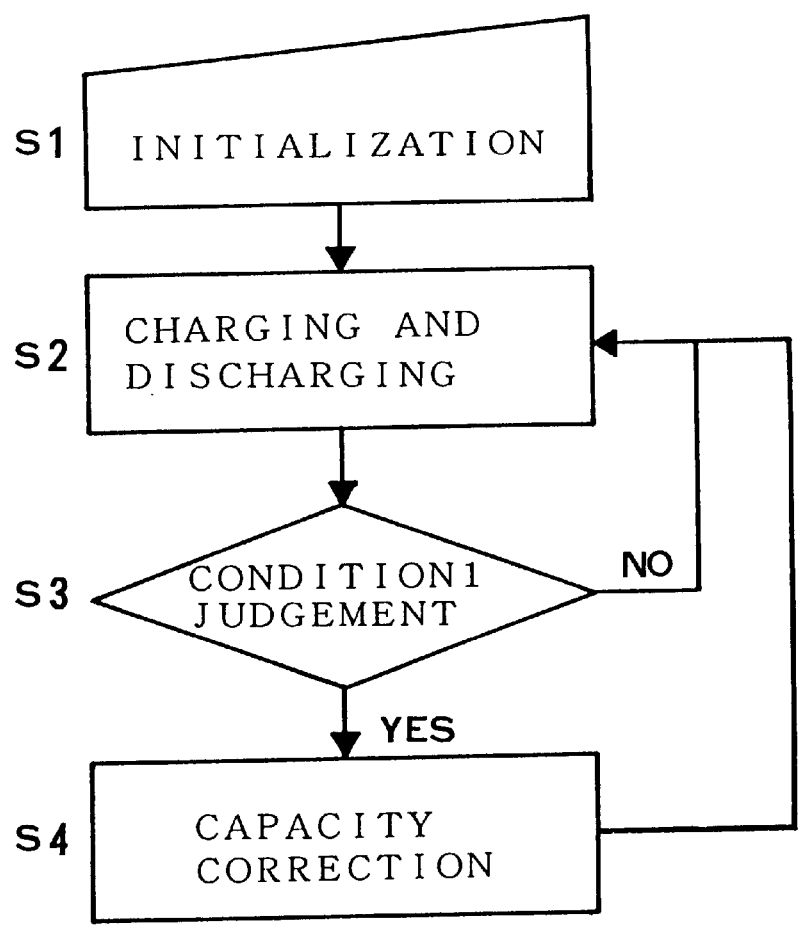
FIG. 4 is a flow-chart showing operation of the first embodiment.

The operation is more explicitly described based on the flow-chart of FIG. 4. In the first step S1, initialization is performed. Here, the battery array 2 is charged to a specified capacity (for example, 50% of full charge capacity).

In the second step S2, battery array 2 charging or discharging occurs. While the computed capacity of the battery array 2 is within the specified range, namely between the upper capacity limit and the lower capacity limit, battery array 2 charging and discharging take place without restriction. As battery array 2 charging progresses and the computed capacity is at or above the upper capacity limit (55%), battery array 2 charging is prohibited and only discharging is permitted until the computed capacity becomes equal to the specified capacity. On the contrary, as battery array 2 discharging progresses and the computed capacity is at or below the lower capacity limit (45%), battery array 2 discharging is prohibited and only charging is permitted until the computed capacity becomes equal to the specified capacity.

In this manner, battery array 2 charging and discharging take place within a specified range between the upper capacity limit and the lower capacity limit. However, as time progresses, a discrepancy between the computed capacity and the actual capacity of the battery array 2 develops, and it is necessary to revise the computed capacity. A decision is made at the third step S3 to judge whether or not the actual capacity of the battery array 2 has reached the upper capacity limit or the lower capacity limit a specified number of times, or whether or not a specified time has elapsed since the last revision. If either of these conditions is satisfied, the computed capacity of the battery array 2 is revised.

Revision of the computed capacity take space in the fourth step S4. When either of the above mentioned conditions is satisfied, forcing charging of the battery array 2 is first performed in step S4 until the temperature or the rate of temperature rise of the entire battery array 2 or of at least one rechargeable battery of the battery array 2 reaches a specified value, or battery voltage reaches a specified voltage.

When either of these conditions is met, battery array 2 charging is prohibited and a predetermined capacity tolerance limit (for example, 95% of full capacity) is written into the battery array 2 computed capacity. The prohibited charging condition is maintained until the battery array 2 computed capacity reaches the specified capacity (namely, 50%).

Thus, by execution of this fourth step S4, the computed capacity of the battery array 2 is revised. Subsequently, operation returns to step S2.

In accordance with operation described above, charging and discharging of the battery array 2 typically proceed within the specified range between the upper capacity limit and the lower capacity limit and is centered at the specified capacity. In addition, the computed capacity of the battery array 2 is periodically revised to insure the charging and discharging are within the specified range described above.

Figure 5:
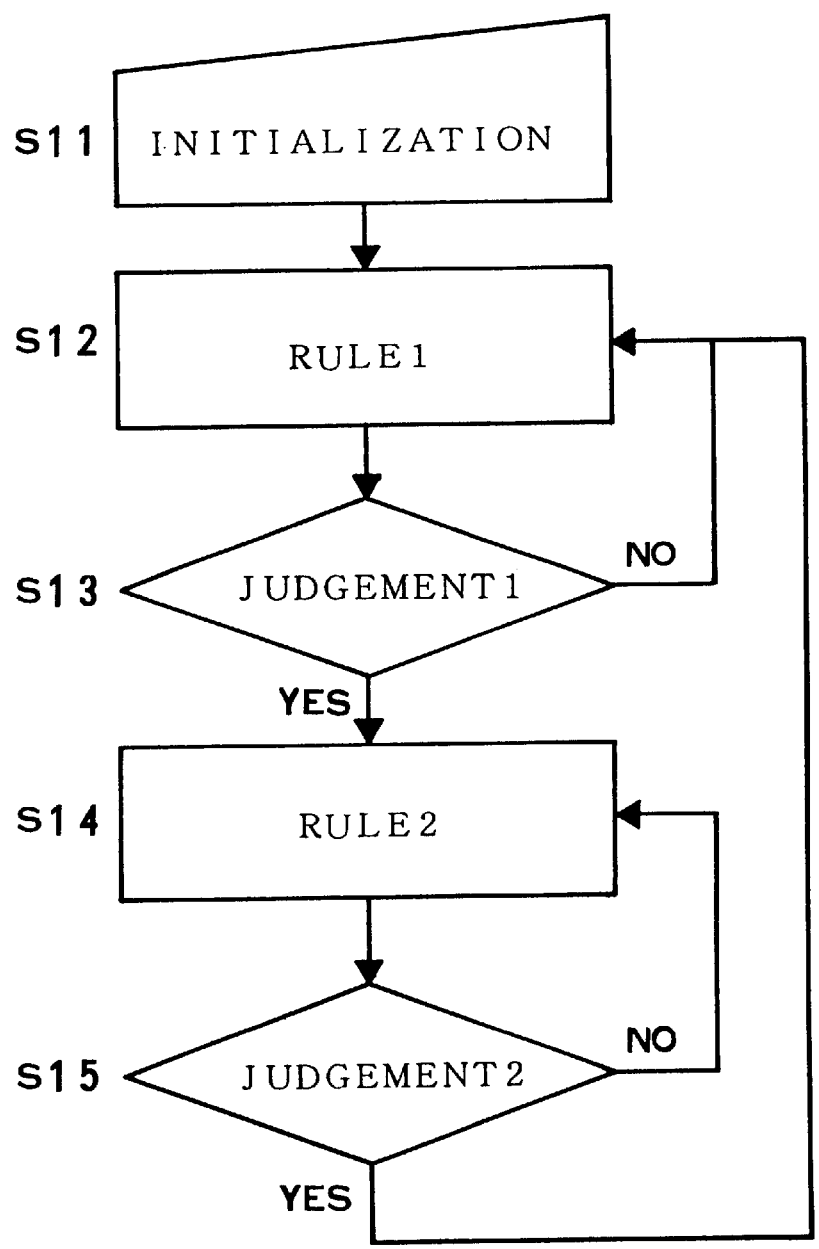
FIG. 5 is a flow-chart showing operation of a second embodiment.

Next, the second embodiment is described based on the flow-chart of FIG. 5. In the first step S11, initialization is performed by charging the battery array 2 to a specified capacity (for example, 50% of full charge capacity) in the same manner as step S1 of FIG. 4. At this time a computed battery array 2 capacity is set to the value of the specified capacity. In addition, a first apparent computed capacity is set lower than the computed capacity.

In the second step S12, battery array 2 charging and discharging proceed according to rule 1. While the first apparent computed capacity of the battery array 2 is within a specified range between an upper capacity limit and a lower capacity limit, battery array 2 charging and discharging take place without restriction. As battery array 2 charging progresses and the first apparent computed capacity is at or above the upper capacity limit, battery array 2 charging is prohibited and only discharging is permitted until the first apparent computed capacity drops to the specified capacity. On the contrary, as battery array 2 discharging progresses and the first apparent capacity is at or below the lower capacity limit, battery array 2 discharging is prohibited and only charging is permitted until the first apparent computed capacity reaches the specified capacity.

In this second step S12, the first apparent computed capacity is smaller than the computed capacity which is also calculated. Put another way, the first apparent computed capacity is calculated such that the computed battery array 2 capacity is greater than the first apparent computed capacity. For example, the first apparent computed capacity could be 90% to 99% of the computed capacity. The computation of the first apparent computed capacity during charging can be accomplished by setting a charging efficiency to a value less than the computed capacity. Consequently, as the first apparent computed capacity transitions within the specified range during charging and discharging, the computed capacity of the battery array 2 gradually rises.

In the third step S13, forced charging of the battery array 2 is performed until the temperature or the rate of temperature rise of the entire battery array 2 or of at least one rechargeable battery of the battery array 2 reaches a specified value, or a battery voltage reaches a specified voltage. When either of these conditions is met, a predetermined capacity tolerance limit (for example, 95% of full capacity) is written into the battery array 2 computed capacity. In addition, a second apparent computed capacity is set higher than the computed capacity.

In the fourth step S14, battery array 2 charging and discharging proceed according to rule 2. Namely, while the second apparent computed capacity of the battery array 2 is within the specified range, battery array 2 charging and discharging take place without restriction. When computed capacity is greater than or equal to the upper capacity limit, battery array 2 charging is prohibited and only discharging is permitted until computed capacity drops to the specified capacity. On the contrary, as battery array 2 discharging progresses and computed capacity is at or below the lower capacity limit, battery array 2 discharging is prohibited and only charging is permitted until the computed capacity reaches the specified capacity.

In this fourth step S14, the second apparent computed capacity is greater than the actual computed capacity which is also calculated. Put another way, the second apparent computed capacity is calculated such that the computed battery array 2 capacity is less than the second apparent computed capacity. For example, the second apparent computed capacity could be 101% to 110% of the computed capacity. The computation of the second apparent computed capacity during charging can be accomplished by setting a charging efficiency to a value greater than the computed capacity. Consequently, as the second apparent computed capacity is controlled to transition within the specified range during charging and discharging, the actual capacity of the battery array 2 gradually decreases.

In the fifth step S15, the specified capacity is written into the computed capacity and the second apparent capacity is also adjusted when the actual capacity of the battery array 2 becomes equal to the specified capacity (namely 50%).

Figure 6:
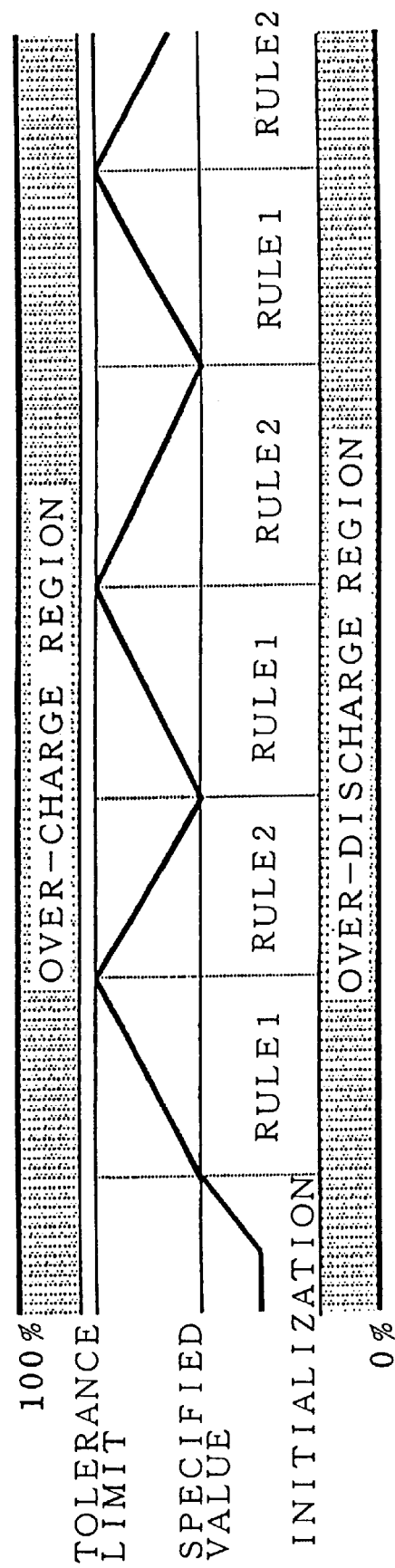
FIG. 6 is a battery capacity graph showing operation of the second embodiment.

In the second embodiment as described above, charging and discharging according to rule 1 and rule 2 are repeatedly performed and, as shown in FIG. 6, charging and discharging are performed, keeping the battery array 2 capacity within the range between the specified capacity and the capacity tolerance limit.

In the second embodiment, in the same manner as the first embodiment, a judgment is made whether or not the computed capacity of the battery array 2 has reached the upper capacity limit or the lower capacity limit a specified number of times, or whether or not a specified time has elapsed since the last revision. If either of these conditions is satisfied, operation moves from step S12 to step 13 or from step S14 to step S15 and the battery array computed capacity is revised.

Figure 7:
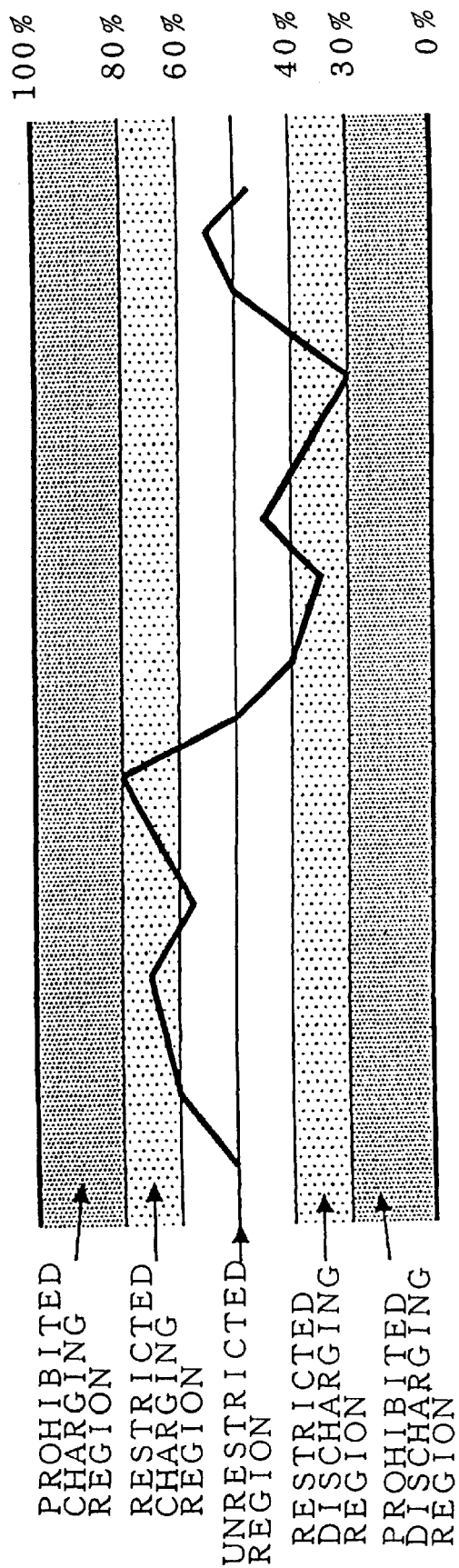
FIG. 7 is a battery capacity graph showing operation of a third embodiment.

As shown in FIG. 7, the third embodiment provides a restricted charging region and a restricted discharging region above and below the battery array 2 unrestricted charging and discharging region of the previously described first embodiment.

Specifically, a region between an upper capacity limit which is lower than battery array 2 full charge capacity (for example, 80% of full charge capacity) and a restricted charging capacity limit lower than the upper capacity limit (for example 60% of full charge capacity) is established as a restricted charging region. Similarly, a region between a lower capacity limit which is greater than the battery array 2 capacity at a complete discharge (for example, 30% of full charge capacity) and a restricted discharging capacity limit greater than the lower capacity limit (for example 40% of full charge capacity) is established as a restricted discharging region. Further, a region between the restricted discharging capacity limit and the restricted charging capacity limit is established as an unrestricted region, and the capacity at the middle of the unrestricted region (namely, 50%) is designated as a specified capacity.

When the battery array 2 computed capacity is within the unrestricted region, battery array 2 charging and discharging take place without restriction. As battery array 2 charging progresses and the computed capacity rises into the restricted charging region, battery array 2 charging is performed with a charging current ⅓ to ½ of a maximum allowed charging current. On the contrary, as battery array 2 discharging progresses and the computed capacity drops into the restricted discharging region, battery array 2 discharging is limited to ⅓ to ½ of a maximum allowed discharge current, thereby prohibiting discharging with large currents.

Further, when the battery array 2 computed capacity is at or above the upper capacity limit, battery array 2 charging is prohibited and only discharging is permitted until the computed capacity drops to the specified capacity. In addition, when battery array 2 computed capacity is at or below the lower capacity limit, battery array 2 discharging is prohibited and only charging is permitted until the computed capacity reaches the specified capacity.

As this invention may be embodied in several forms without departing from the spirit of essential characteristics thereof, the present embodiment is therefore illustrative and not restrictive. The scope of the invention is defined by the claims rather than by the description preceding them, and all changes that fall within the meets and bounds of the claims or an equivalence of such meets an bounds thereof, are therefore intended to be embraced by the claims.

What is claimed is:

1. A method of controlling the charging and discharging of a battery array of a plurality of rechargeable batteries connected in series, the method comprising:

establishing an upper capacity limit for the battery array which is less than a full charge capacity of the battery array;

establishing a lower capacity limit for the battery array which is greater than a full discharge capacity and less than the upper capacity limit;

establishing a specified level between the upper capacity limit and the lower capacity limit;

determining a computed charge level of the battery array;

adjusting the computed charge level based on the charging and discharging of the battery array;

while the computed charge level is between the lower capacity limit and the upper capacity limit, allowing the battery array to be charged or discharged;

if the computed charge level is at or above the upper capacity limit, prohibiting charging until the computed charge level is equal to or lower than the specified level; and if the computed charge level is at or below the lower capacity limit, prohibiting discharging until the computed charge level is equal to or higher than the specified level.

2. The method of controlling the charging and discharging of the battery array, as claimed in claim 1, further comprising revising the computed charge level when the computed charge level has equaled the upper capacity limit or the lower capacity limit a specified number of times.

3. The method of controlling the charging and discharging of the battery array, as claimed in claim 2, wherein said revising of the computed charge level includes:

charging the battery array until a temperature or a rate of temperature rise of at least one of the plurality of rechargeable batteries reaches a specified value; and establishing a capacity tolerance limit, which is lower than the full charge capacity and higher than the upper capacity limit, as the computed charge level.

4. The method of controlling the charging and discharging of the battery array, as claimed in claim 2, wherein said revising of the computed charge level includes:

charging the battery array until a battery voltage of at least one of the plurality of rechargeable batteries reaches a specified voltage; and establishing a capacity tolerance limit, which is lower than the full charge capacity and higher than the upper capacity limit, as the computed charge level.

5. The method of controlling the charging and discharging of the battery array, as claimed in claim 1, further comprising revising the computed charge level periodically.

6. The method of controlling the charging and discharging of the battery array, as claimed in claim 5, wherein said revising of the computed charge level includes:

charging the battery array until a temperature or a rate of temperature rise of at least of one of the plurality of rechargeable batteries reaches a specified value; and establishing a capacity tolerance limit, which is lower than the full charge capacity and higher than the upper capacity limit, as the computed charge level.

7. The method of controlling the charging and discharging of the battery array, as claimed in claim 5, wherein said revising of the computed charge level includes:

charging the battery array until a battery voltage of at least one of the plurality of rechargeable batteries reaches a specified voltage; and establishing a capacity tolerance limit, which is lower than the full charge capacity and higher than the upper capacity limit, as the computed charge level.

8. The method of controlling the charging and discharging of the battery array, as claimed in claim 1, wherein said establishing of the specified level comprises establishing the specified level as approximately 50% of the full charge capacity.

9. A method of controlling the charging and discharging of a battery array of a plurality of rechargeable batteries connected in series, the method comprising:

establishing an upper capacity limit for the battery array which is less than a full charge capacity of the battery array;

establishing a lower capacity limit for the battery array which is greater than a full discharge capacity and less than the upper capacity limit;

establishing a specified level between the upper capacity limit and the lower capacity limit;

determining a computed charge level of the battery array;

determining a first apparent computed charge level to be less than the computed charge level;

adjusting both the computed charge level and the first apparent computed charge level based on charging and discharging of the battery array;

while the first apparent computed charge level is between the lower capacity limit and the upper capacity limit, allowing the battery array to be charged or discharged;

if the first apparent computed charge level is at or above the upper capacity limit, prohibiting charging until the first apparent computed charge level is equal to or lower than the specified level; and if the first apparent computed charge level is at or below the lower capacity limit, prohibiting discharging until the first apparent computed charge level is equal to or higher than the specified level.

10. The method of controlling the charging and discharging of the battery array, as claimed in claim 9, further comprising revising the computed charge level to equal a capacity tolerance limit when the first apparent computed charge level has equaled the upper capacity limit or the lower capacity limit a specified number of times and reestablishing the first apparent computed charge level to be less than the computed charge level.

11. The method of controlling the charging and discharging of the battery array, as claimed in claim 10, wherein said revising of the computed charge level includes:

charging the battery array until a temperature or a rate of temperature rise of at least one of the plurality of rechargeable batteries reaches a specified value; and establishing the capacity tolerance limit, which is lower than the full charge capacity and higher than the upper capacity limit, as the computed charge level and reestablishing the first apparent computed charge level to be less than the computed charge level.

12. The method of controlling the charging and discharging of the battery array, as claimed in claim 10, wherein said revising of the computed charge level includes:

charging the battery array until a battery voltage of at least one of the plurality of rechargeable batteries reaches a specified voltage; and establishing the capacity tolerance limit, which is lower than the full charge capacity and higher than the upper capacity limit, as the computed charge level and reestablishing the first apparent computed charge level to be less than the computed charge level.

13. The method of controlling the charging and discharging of the battery array, as claimed in claim 10, wherein said establishing of the capacity tolerance limit as the computed charge level comprises establishing the capacity tolerance limit as approximately 95% of the full charge capacity.

14. The method of controlling the charging and discharging of the battery array, as claimed in claim 10, further comprising:

subsequent to establishing the capacity tolerance limit as the computed charge level, determining a second apparent computed charge level to be greater than the computed charge level, and adjusting both the computed charge level and the second apparent computed charge level based on charging and discharging of the battery array;

while the second apparent computed charge level is between the lower capacity limit and the upper capacity limit, allowing the battery array to be charged or discharged;

if the second apparent computed charge level is at or above the upper capacity limit, prohibiting charging until the second apparent computed charge level is equal to or lower than the specified level; and if the second apparent computed charge level is at or below the lower capacity limit, prohibiting discharging until the second apparent computed charge level is equal to or higher than the specified level.

15. The method of controlling the charging and discharging of the battery array, as claimed in claim 14, further comprising revising the computed charge level to equal the specified level when the second apparent computed charge level has equaled the upper capacity limit or the lower capacity limit a specified number of times and reestablishing the second apparent computed charge level to be greater than the computed charge level.

16. The method of controlling the charging and discharging of the battery array, as claimed in claim 15, wherein said revising of the computed charge level includes:

charging or discharging the battery array until an actual capacity of the battery array equals the specified level; and establishing the computed charge level as the specified level and reestablishing the second apparent computed charge level to be greater than the computed charge level.

17. The method of controlling the charging and discharging of the battery array, as claimed in claim 14, further comprising revising the computed charge level periodically to equal the specified level and reestablishing the second apparent computed charge level to be greater than the computed charge level.

18. The method of controlling the charging and discharging of the battery array, as claimed in claim 17, wherein said revising of the computed charge level includes:

charging or discharging the battery array until an actual capacity of the battery array equals the specified level; and establishing the computed charge level as the specified level and reestablishing the second apparent computed charge level to be greater than the computed charge level.

19. The method of controlling the charging and discharging of the battery array, as claimed in claim 9, further comprising revising the computed charge level periodically to equal a capacity tolerance limit and reestablishing the first apparent computed charge level to be less than the computed charge level.

20. The method of controlling the charging and discharging of the battery array, as claimed in claim 19, wherein said revising of the computed charge level includes:

charging the battery array until a temperature or a rate of temperature rise of at least of one of the plurality of rechargeable batteries reaches a specified value; and establishing the capacity tolerance limit, which is lower than the full charge capacity and higher than the upper capacity limit, as the computed charge level and reestablishing the first apparent computed charge level to be less than the computed charge level.

21. The method of controlling the charging and discharging of the battery array, as claimed in claim 19, wherein said revising of the computed charge level includes:

charging the battery array until a battery voltage of at least one of the plurality of rechargeable batteries reaches a specified voltage; and establishing the capacity tolerance limit, which is lower than the full charge capacity and higher than the upper capacity limit, as the computed charge level and reestablishing the first apparent computed charge level to be less than the computed charge level.

22. The method of controlling the charging and discharging of the battery array, as claimed in claim 19, further comprising:
   subsequent to establishing the capacity tolerance limit as the computed charge level, determining a second apparent computed charge level to be greater than the computed charge level, and adjusting both the computed charge level and the second apparent computed charge level based on charging and discharging of the battery array;
   while the second apparent computed charge level is between the lower capacity limit and the upper capacity limit, allowing the battery array to be charged or discharged;
   if the second apparent computed charge level is at or above the upper capacity limit, prohibiting charging until the second apparent computed charge level is equal to or lower than the specified level; and
   if the second apparent computed charge level is at or below the lower capacity limit, prohibiting discharging until the second apparent computed charge level is equal to or higher than the specified level.

23. The method of controlling the charging and discharging of the battery array, as claimed in claim 22, further comprising revising the computed charge level to equal the specified level when the second apparent computed charge level has equaled the upper capacity limit or the lower capacity limit a specified number of times and reestablishing the second apparent computed charge level to be greater than the computed charge level.

24. The method of controlling the charging and discharging of the battery array, as claimed in claim 23, wherein said revising of the computed charge level includes:
   charging or discharging the battery array until an actual capacity of the battery array equals the specified level; and
   establishing the computed charge level as the specified level and reestablishing the second apparent computed charge level to be greater than the computed charge level.

25. The method of controlling the charging and discharging of the battery array, as claimed in claim 22, further comprising revising the computed charge level periodically to equal the specified level and reestablishing the second apparent computed charge level to be greater than the computed charge level.

26. The method of controlling the charging and discharging of the battery array, as claimed in claim 25, wherein said revising of the computed charge level includes:
   charging or discharging the battery array until an actual capacity of the battery array equals the specified level; and
   establishing the computed charge level as the specified level and reestablishing the second apparent computed charge level to be greater than the computed charge level.

27. The method of controlling the charging and discharging of the battery array, as claimed in claim 19, wherein said establishing of the capacity tolerance limit as the computed charge level comprises establishing the capacity tolerance limit as approximately 95% of the full charge capacity.

28. The method of controlling the charging and discharging of the battery array, as claimed in claim 9, wherein said establishing of the specified level comprises establishing the specified level as approximately 50% of the full charge capacity.

29. A method of controlling the charging and discharging of a battery array of a plurality of rechargeable batteries connected in series, the method comprising:
   establishing an upper capacity limit for the battery array which is less than a full charge capacity of the battery array;
   establishing a lower capacity limit for the battery array which is greater than a full discharge capacity and less than the upper capacity limit;
   establishing a specified level between the upper capacity limit and the lower capacity limit;
   determining a computed charge level of the battery array;
   determining a second apparent computed charge level to be greater than the computed charge level;
   adjusting both the computed charge level and the second apparent computed charge level based on charging and discharging of the battery array;
   while the second apparent computed charge level is between the lower capacity limit and the upper capacity limit, allowing the battery array to be charged or discharged;
   if the second apparent computed charge level is at or above the upper capacity limit, prohibiting charging until the first apparent computed charge level is equal to or lower than the specified level; and
   if the second apparent computed charge level is at or below the lower capacity limit, prohibiting discharging until the second apparent computed charge level is equal to or higher than the specified level.

30. A method of controlling the charging and discharging of a battery array of a plurality of rechargeable batteries connected in series, the method comprising:
   establishing an upper capacity limit for the battery array which is less than a full charge capacity of the battery array;
   establishing a lower capacity limit for the battery array which is greater than a full discharge capacity and less than the upper capacity limit;
   establishing a restricted charging capacity limit for the battery array which is less than the upper capacity limit and greater than the lower capacity limit;
   establishing a restricted discharging capacity limit for the battery array which is less than the restricted charging capacity limit and greater than the lower capacity limit;
   establishing a specified level between the restricted charging capacity limit and the restricted discharging capacity limit;
   determining a computed charge level of the battery array;
   adjusting the computed charge level based on charging or discharging of the battery array;
   while the computed charge level is between the restricted charging capacity limit and the restricted discharging capacity limit, allowing the battery array to be charged or discharged;
   if the computed charge level is between the restricted charging capacity limit and the upper capacity limit, allowing the battery array to be discharged or restrictively charged by a specified limited charging current;
   if the computed charge level is between the restricted discharging capacity limit and the lower capacity limit, allowing the battery array to be charged or restrictively discharged by a specified limited discharging current;

if the computed charge level is at or above the upper capacity limit, prohibiting charging until the computed charge level is equal to or lower than the specified level; and if the computed charge level is at or below the lower capacity limit, prohibiting discharging until the computed charge level is equal to or higher than the specified level.

31. The method of controlling the charging and discharging of the battery array, as claimed in claim 30, wherein said allowing of the battery array to be restrictively discharged comprises allowing the battery array to be discharged at a restricted current level which is approximately ½ to ⅓ of an upper limit value of a maximum discharging current.

32. The method of controlling the charging and discharging of the battery array, as claimed in claim 30, wherein said allowing of the battery array to be restrictively charged comprises allowing the battery array to be charged at a restrictive current level which is approximately ½ to ⅓ of an upper limit value of a maximum charging current.

* * * * *